UNITED STATES PATENT OFFICE.

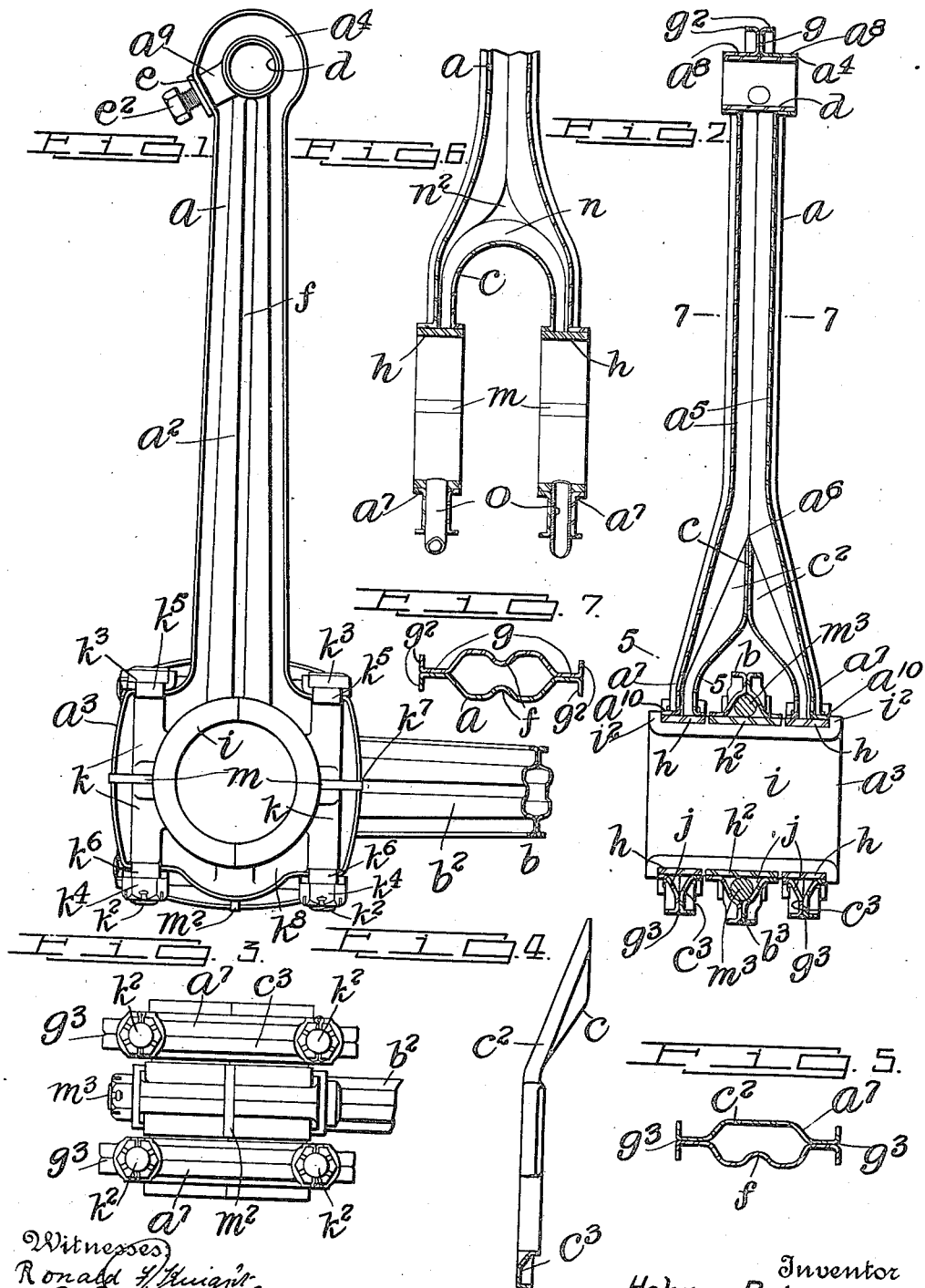

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

CONNECTING-ROD.

1,176,302.   Specification of Letters Patent.   Patented Mar. 21, 1916.

Application filed August 6, 1915. Serial No. 43,938.

*To all whom it may concern:*

Be it known that I, HEBRON B. LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, and particularly to forked connecting rods, and more particularly to connecting rods used in the V-type engines, in which the larger ends of two connecting rods are connected to one crank, or connected one rod with the other, and the object of the invention is to facilitate, simplify and cheapen the manufacture of devices of this class, while at the same time providing a connecting rod or rods that will be light and strong and durable; and with this and other objects in view the invention consists in a connecting rod or rods of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of a connecting rod made according to my invention; Fig. 2 a longitudinal section through one of the rod members in the plane of the piston pin and crank pin heads thereof, the crank pin head of the other rod member being also shown in transverse section; Fig. 3 a bottom plan view of the device as shown in Fig. 1; Fig. 4 a side view of one part of a reinforcing yoke which I employ to reinforce the larger or crank pin head portion of the main rod member; Fig. 5 a transverse section on the line 5—5 of Fig. 2; Fig. 6 a view similar to Fig. 2 but showing only a part of the construction shown in Fig. 2 and showing a modification; and, Fig. 7 a transverse section on the line 7—7 of Fig. 2.

In carrying my invention into effect, I provide two connecting rod members $a$ and $b$, comprising respectively shank members $a^2$ and $b^2$ having larger end or head portions $a^3$ and $b^3$. The rod member $a$ is provided with a smaller end or head portion $a^4$, and, in practice, the rod member $b$ is provided with a similar smaller end or head portion but, in the accompanying drawing, the smaller end or head portion of the rod member $b$ is not shown. In the following specification the rod member $a$ will be called the main rod member and the rod member $b$ the supplemental rod member. It will be understood, of course, that the larger end or head portions of the rod members $a$ and $b$ connect, in practice, with the crank shaft of the motor, not shown, while the smaller ends or head portions connect with the pistons in the separate cylinders.

The main rod member $a$, or the shank thereof, is composed of two similar longitudinal parts $a^5$ stamped from sheet metal, and the separate parts of said rod member are bent outwardly at $a^6$ to form the forked larger end of said rod member, consisting of two parallel side parts $a^7$ and set into the fork thus formed is a supplemental reinforcing yoke-shaped device $c$, consisting of two similar side parts $c^2$, and one of which is shown detached in Fig. 4, and the reinforcing yoke device $c$ as shown in Fig. 2 is V-shaped at its upper end, or approximately so, and is provided with parallel side members $c^3$ which together with the parallel parts $a^7$ of the main rod member $a$, or the larger end thereof, make up the larger or forked end of said rod member, and the reinforcing yoke device $c$ is secured in and to the parts $a^7$ of the main rod member $a$, and form in connection therewith a strong and durable crank shaft end or head for said main rod member.

The separate portions of the main rod member $a$ are provided at the smaller end thereof with bosses $a^8$ forming a bearing for the piston pin which is not shown, and through which is passed and in which is secured a supplemental sleeve bearing $d$ and at one side of the smaller end or head $a^4$ the separate parts thereof are provided with radial key pin bosses $a^9$ through which is passed and in which is secured a threaded sleeve $e$ through which is passed a threaded key pin $e^2$, which locks the piston pin in the rod and against axial movement and rotation therein.

The body of the shank of the main rod member $a$ is preferably of the form shown in cross section in Fig. 7, the separate side parts thereof being grooved centrally and longitudinally as shown at $f$, and the separate parts of said rod member are provided with flanges $g$ which extend entirely around said rod member including the smaller end or head $a^4$ thereof, and the separate parts $a^7$ of the larger or forked end or head portion thereof, and the outer edges of said flanges are bent outwardly as shown at $g^2$, and this forms a T-shaped flange which extends entirely around the shank portion of the rod member $a$ longitudinally thereof, and the smaller end or head portion $a^4$ thereof, and the sides $c^3$ of the reinforcing yoke $c$, are similarly formed, and when said reinforcing yoke is secured in position, as hereinbefore described, the separate side members $a^7$ of the yoke-shaped end of the main rod member $a$, of which the reinforcing yoke $c$ forms a part are provided with similar T-shaped flanges $g^3$ which extend entirely around the head $a^3$ of said main rod member, and the side portions of the head $a^3$ of the main yoke member $a$ are provided with circular apertures having reinforcing sleeves $h$ which are secured therein by welding or in any other manner.

The supplemental rod member $b$ is made exactly in the same manner as the main rod member $a$, or the shank thereof, and the smaller end or head thereof, and the larger end or head $b^3$ of the supplemental rod member $b$ consists of a single circular body portion in which is secured a reinforcing sleeve $h^2$ similar to the reinforcing sleeves $h$, and passed through and secured in the reinforcing sleeves $h$ and $h^2$ is a bearing sleeve $i$ of Babbitt metal or any other suitable material, and the end portions of which are bent outwardly to form flanges $i^2$ which overlap the reinforcing sleeves $h$ and also the flange members $a^{10}$ of the parallel side parts $a^7$ of the main yoke member $a$.

It will be understood that the crank of the crank shaft, or the crank pin of the crank shaft, passes through the bearing sleeve $i$ and the larger end or head portions of both of the rod members $a$ and $b$, including the reinforcing sleeves $h$ and $h^2$ are secured to the bearing sleeve $i$, or said bearing sleeve is secured in said reinforcing sleeves, and this connection may be made by welding or brazing or by both welding and brazing, or in any desired manner.

The parallel side parts $a^7$ of the larger end portion of the main rod member $a$ and the head $b^3$ of the supplemental rod member where the sleeves $h$ and $h^2$ are secured therein are V-shaped in cross section as shown at $j$ in Fig. 2, except where the shanks of said rod members connect with said parts, and this also strengthens said parts, as will be readily understood, and the separate side portions $a^7$ of the larger end or head of the main rod member $a$ are provided with bolt bosses $k$ parallel with the shank portion and through which are passed bolts $k^2$ to secure said parts together, and said bolts are provided with nuts $k^3$ and $k^4$, and with washers, clips or fastening devices $k^5$ and $k^6$, and the washers $k^5$ are provided with outwardly directed members to prevent the nuts $k^3$ from turning, this construction being similar to that described and claimed in another application for Letters Patent of the United States filed by me April 25, 1915, Serial No. 24,481, and said washers are also provided with inwardly directed clips forming fastening devices to aid in securing the reinforcing yoke-shaped device to and in the forked end of the rod, as clearly shown in Fig. 3. The larger end or head portion of the main rod member $a$ is also cut transversely and at right angles to the shank as shown at $k^7$ to form a cap $k^8$ and between the separate parts of the head thus formed are placed shims $m$. The larger end or head $b^3$ of the supplemental rod member $b^2$ is also cut transversely to form a cap and between the separate parts of said head or end is placed a shim $m^2$, and the separate parts of said head or end of the rod member $b$ are connected by bolts $m^3$, similar to the bolts $k^2$ and having similar nuts and washers, this construction being also similar to that described and claimed in the application above referred to.

It must be understood that all the parts of my improved connecting rod, or the separate members $a$ and $b$, thereof are made from sheet metal, preferably sheet steel, cut, pressed, stamped or formed into the desired shapes and the reinforcing sleeves $h$ and $h^2$ may be similarly formed and the bearing sleeve $i$ is composed of two parts as shown in Fig. 1. My invention is not limited, however, to the exact form and construction of the supplemental rod member $b$, the main feature of the invention described and claimed herein being the rod member $a$ made as shown and described and provided with the reinforcing forked device $c$.

In Fig. 6, I have shown a modification of the main rod member $a$ in which the reinforcing yoke device $c^2$ instead of being pointed or in the form of an inverted V, at the top is provided with a curved or arc-shaped head as shown at $n$, and there is a triangular space $n^2$ over this yoke-shaped device which extends centrally through the base portion of the shank of the rod member $a$. The separate parts or sides $a^7$ of the larger end or head of the rod member $a$, in this form of construction, are provided with tubes $o$ arranged in the bottom portion thereof and which extend inwardly through the sleeves $h$, in the construction shown, and which serve to scoop up oil in the crank shaft case when the engine is in operation to lubricate the parts $h$, $h^2$ and $i$.

The yoke-shaped piece $c$, in the construction shown in Fig. 6, is made of one piece while the yoke-shaped piece $c$ shown in Figs. 2 and 4 is composed of two pieces, and this together with the tubes $o$ is the distinctive feature of the modification shown in Fig. 6.

The separate parts of the separate rod members constructed as hereinbefore described may be connected by welding or brazing, or by both processes, as herein described or after the rod has been completely formed it may be brazed and the separate parts of the rod members may also be connected by clamps or clips applied to the flanges which extend around said rod members longitudinally thereof as in the application herein referred to.

In the foregoing specification where I refer to a rod member as having a forked head or end, I mean that said end is formed or separated in a plane at right angles to the crank shaft and that the rod has two separate cylindrical or semi-cylindrical bearings upon the shaft or upon the bearing metal. The main point is that the rod is separated in a plane at right angles to the crank shaft, or the axis thereof, and has two separate bearings thereon, and this clearly distinguishes the construction described and claimed herein from ordinary crank rod devices having but one bearing or a single crank shaft head portion with which a detachable cap is connected.

Having fully described my invention, what I claim as new and desire to secure by Letters Patent, is:—

1. A connecting rod composed of two similar longitudinal and abutting parts spread at one end to form a fork to receive a supplemental rod, and means for reinforcing the forked end of the rod.

2. A connecting rod composed of two similar longitudinal and abutting parts spread at one end to form a fork to receive a supplemental rod, said fork being reinforced by a yoke-shaped device secured therein.

3. A connecting rod composed of two longitudinal, abutting and similar parts spread at one end to form a fork to receive a supplemental rod, means for reinforcing said fork, said rod being provided at the forked end with a detachable cap and means for securing said cap in position.

4. A connecting rod having a forked head end, and means for reinforcing the forked portion and bolt bosses formed by and between the rod and the reinforcements.

5. A connecting rod composed of two similar parts of sheet metal, said parts being separated at one end and in a plane at right angles to the crank shaft aperture to form a fork and a reinforcing yoke secured in said fork.

6. A connecting rod composed of two similar parts of sheet metal, said parts being separated at one end and in a plane at right angles to the crank shaft aperture to form a fork, and a reinforcing yoke also composed of sheet metal and secured in said fork.

7. A forked connecting rod device composed of main and supplemental rod members, the main rod member being composed of separate similar longitudinal parts of sheet metal separated at one end to form a fork, and a reinforcing yoke-shaped member also composed of sheet metal and secured in said fork.

8. A forked connecting rod device composed of main and supplemental rod members, the main rod member being composed of separate similar longitudinal parts of sheet metal separated at one end to form a fork, a reinforcing yoke-shaped part also composed of sheet metal and secured in said fork, said supplemental rod member being also composed of two similar longitudinal parts of sheet metal, and the crank shaft end portions of said main and supplemental rod members being also provided with reinforcing sleeves.

9. A connecting rod device composed of main and supplemental rod members, the main rod member being composed of longitudinal and abutting parts of sheet metal permanently secured together and spread at one end to form a fork to receive the corresponding end of the supplemental rod member.

10. A connecting rod device composed of sheet metal and having a crank end forked to provide parallel bearings, and means for reinforcing said forked end permanently secured therein and forming a part thereof.

11. A connecting rod device composed of sheet metal and having a crank end forked to provide parallel bearings, and means for reinforcing and joining both tines of said forked end and forming part thereof.

12. A connecting rod device composed of sheet metal and having a crank end forked to provide parallel bearings, and a yoke-shaped member secured in said forked end and reinforcing the same and forming part thereof.

13. A connecting rod device having a head end forked to provide two separate bearings for a crank shaft, and means secured in said forked end for reinforcing the same and through which said shaft passes.

14. A connecting rod device composed of a plurality of parts of sheet metal permanently secured together and forked at one end to provide parallel bearings, and means secured in said forked end for reinforcing the same.

15. A connecting rod device composed of a plurality of parts of sheet metal and forked at one end to provide parallel bearings, and means for reinforcing the forked end and for joining or connecting both tines of the fork and secured therein.

16. A connecting rod device having a splayed crank end composed of a plurality of parts abutting in a plane at right angles to the crank shaft aperture.

17. A connecting rod device having a forked crank shaft head end whereby two separate bearings for said crank shaft are provided, and means secured in said forked end for reinforcing both tines thereof and forming part of said end.

18. A connecting rod device having a forked head end, the tines of which are composed of a plurality of substantially circular parts.

19. A connecting rod device composed of a plurality of parts permanently secured together and having a crank shaft head end forked to provide parallel bearings, and means for reinforcing said end, said end being also provided with a cap, and means for securing said cap in position.

20. A connecting rod device having a crank end forked to provide parallel bearings, and composed of a plurality of parts and having means for reinforcing the forked end.

21. A connecting rod device having a forked end and composed of a plurality of parts and having means for reinforcing the forked end, said rod and reinforcement having registering recesses forming bolt apertures.

22. A connecting rod device composed of a plurality of parts and having a splayed crank head end provided with a reinforcing flange extending around said end.

23. A connecting rod device composed of a plurality of parts and having a splayed crank head end and provided with reinforcing flanges extending along the shank portion.

24. A connecting rod device composed of a plurality of parts and having a forked crank head end and provided with flanges extending around the tines of the fork.

25. A connecting rod device having a splayed crank head end, means for reinforcing the splayed portion, and a reinforcing flange formed with and extending around the splayed head end.

26. A connecting rod device having a forked crank head end, means for reinforcing the forked portion, and a T-shaped flange extending around the tines of the forked head end.

27. A connecting rod device having a splayed head end, and having means for reinforcing the splayed end, said rod and reinforcement having registering recesses forming bolt apertures.

28. A connecting rod device composed of a plurality of parts permanently secured together and spread at one end to form a fork and each tine of which is semi-circular in form.

29. A connecting rod device composed of a plurality of parts and spread at one end to form a fork, each tine of which is semi-circular in form, and means for reinforcing the forked portion.

30. A connecting rod device having a splayed crank head end, means for reinforcing the splayed portion and metal fastening devices securing together the rod and reinforcement.

In testimony that I claim the foregoing as my invention I have signed my name in presence of the subscribing witnesses this 4th day of August, 1915.

HEBRON B. LAYMAN.

Witnesses:
M. BOCHELMAN,
H. C. THOMPSON.